March 24, 1925.

M. RESEK 1,530,738

LIQUID LEVEL GAUGE

Filed June 6, 1919

Inventor,
Marc Resek,
By Hull, Smith, Brock & West
Attys.

Patented Mar. 24, 1925.

1,530,738

UNITED STATES PATENT OFFICE.

MARC RESEK, OF CLEVELAND HEIGHTS, OHIO, ASSIGNOR TO THE CLEVELAND METAL PRODUCTS COMPANY, OF CLEVELAND, OHIO, A CORPORATION OF OHIO.

LIQUID-LEVEL GAUGE.

Application filed June 6, 1919. Serial No. 302,146.

*To all whom it may concern:*

Be it known that I, MARC RESEK, a citizen of the United States, residing at Cleveland Heights, in the county of Cuyahoga and State of Ohio, have invented a certain new and useful Improvement in Liquid-Level Gauges, of which the following is a full, clear, and exact description, reference being had to the accompanying drawings.

This invention relates to liquid level gauges that are adapted for use in fuel reservoirs of oil stoves and other similar connections for indicating the quantity of liquid in the reservoir from time to time. The objects of the invention are to provide a thoroughly reliable and easy acting yet comparatively simple and inexpensive gauge of the aforesaid nature that is durable and not likely to stick or get out of order.

Broadly speaking, the invention consists of an indicator operated by a helical shaft as the latter is rotated through its operative connection with a lever pivotally supported at one end and adapted to be swung by a float attached to its other end and which rises and falls according to the change in the level of the liquid. Preferably, the helical shaft is produced by twisting a metal strap about its longitudinal axis to produce a series of convolutions, and the lever above referred to may consist of a loop of wire which embraces the shaft and the branches whereof are spaced apart sufficiently to comfortably receive between them the thickness of the metal whereof the shaft is formed so that any swinging movement of the lever is immediately converted into rotary motion of the shaft.

Figure 1:
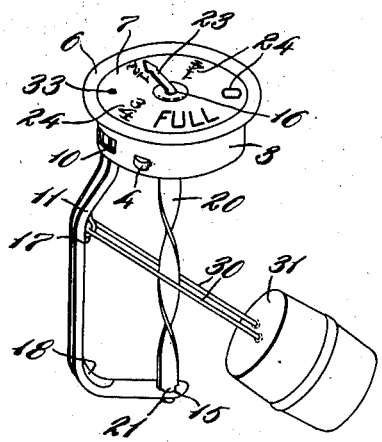
Figure 2:
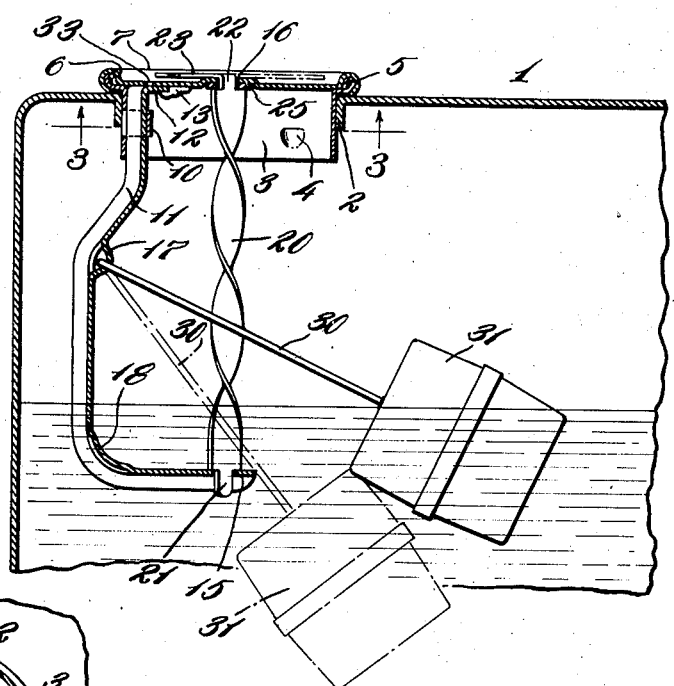
Figure 3:
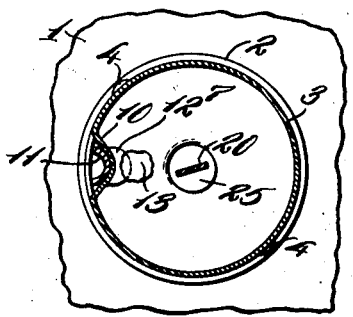

Objects additional to those above set forth and relating more to structural improvements will become more apparent as the description proceeds, reference being had therein to the accompanying drawing in which Fig. 1 is a perspective view of my improved gauge; Fig. 2 is a vertical section through the gauge and the adjacent part of a tank or reservoir wherein the gauge is installed; and Fig. 3 is a sectional detail on the line 3—3 of Fig. 2.

The tank or reservoir is designated 1 and its top wall is shown as provided with an aperture surrounded by an inwardly directed flange 2 through which is adapted to be pressed a collar 3 constituting a part of the gauge structure, the collar being shown as having diametrically opposed projections 4 which are arranged to engage beneath the lower edge of the flange 2 to hold the collar against too easy withdrawal. The upper end of the collar is flared outwardly and its upper edge is shown as turned upwardly and over to form a bead 5 about which the "wired" or beaded edge 6 of a dial 7 is crimped so as to secure the dial and collar firmly together. A strap 10 is struck inward from one side of the collar 4 to provide a socket through which the upper end of a bracket 11 may be inserted, the extreme upper end of the bracket being turned laterally at 12 to lie against the underneath surface of the dial and to which it may be secured in any suitable manner as by a deposit of solder 13. The bracket 11 is constructed of sheet metal, and to impart to it the requisite stiffness it is made in the form of a channel, as best illustrated in Fig. 3. The bracket extends downwardly, and for a part of the way outwardly, from the collar and its lower end is turned inwardly and provided with a bearing aperture 15 that is substantially in axial alignment with a central aperture 16 of the dial. An eye 17 is shown as formed on the bracket by striking out a tongue from its web in the angle between the portion furthest removed from the axis of the apertures 15 and 16 and the inclined portion adjacent the collar 3. The proper relation between the bottom or horizontal branch of the bracket and the offset portion from which it extends may be better preserved by beading the web of the bracket at the angle between such parts, as indicated at 18.

A helical shaft 20, which consists of a twisted strap of metal, has its lower end reduced in width to provide a gudgeon 21 that is journaled within the aperture 15 of the bracket and the upper end of the shaft is also reduced in width to provide a bearing portion 22 that is journaled in aperture 16 of the dial, the reduced end of the shaft beyond the bearing portion 22 being turned laterally at right angles to the axis of the shaft and shaped to form a hand or pointer 23 which is adapted to swing about the dial when the shaft is rotated for cooperation with the indications 24 that are printed upon or impressed within the upper surface of the dial. The central portion of the dial is raised slightly to form in its under-surface a recess for the reception of a circular washer 25 which is applied to the reduced upper end of the shaft before it is inserted through the aperture 16.

A wire loop 30 is engaged through the previously mentioned eye 17 of bracket 11 and its respective branches are disposed on opposite sides of the helical shaft so that as the loop is swung it will cooperate with the shaft similarly as a nut cooperates with a screw to impart rotary motion to the shaft. A float 31 is attached to the free end of the loop. While I have referred to the element 30 as a loop, it is, in effect, a lever pivoted at 17 to the bracket 11. While the construction described is a desirable one, it is clear that the same may be altered materially without departing from the spirit of the invention.

Obviously a given relation must exist between the dial and bracket 11 so that when the float is in its lowest position the indicator will register "zero". To ensure this proper relation in assembling the device, the dial is provided with a "positioning" aperture 33 which the assembler knows must register with the slot in the collar 3 from which strap 10 is struck, and through which means the upper end of the bracket 11 is attached to the collar. It would not be advisable to have the "positioning" aperture remain open after the gauge is completed wherefore the parts are so proportioned that the laterally turned upper end of the bracket will close the aperture.

Having thus described my invention, what I claim is:—

1. In combination, an indicator, a shaft operatively connected thereto and rotatably supported in a vertical position, said shaft having a flattened portion twisted in helical form, a lever having one end pivotally supported at a point spaced a material distance laterally from said shaft and having a portion intermediate its ends engaging the flattened helical portion of the shaft so as to turn the shaft when the lever is swung on its pivot, and a float connected to the free end of the lever.

2. In combination, a supporting structure, an indicator sustained thereby, a shaft operatively connected to the indicator and rotatably supported by said structure in a vertical position, said shaft having a flattened portion twisted in helical form, a lever having one end pivotally supported by the aforesaid structure at a point spaced laterally from the shaft, said lever comprising substantially parallel side branches between which the flattened helical portion of the shaft is disposed whereby the shaft is caused to rotate when the lever is swung on its pivot, and a float carried by the free end of the lever.

3. In combination, a dial having a bearing aperture, a bracket extending downwardly and outwardly therefrom, and turned inwardly at its lower end in opposed relation to the dial, the inturned portion having a bearing aperture in alignment with the bearing aperture of the dial, a shaft having its ends journaled in said apertures, said shaft having a flattened portion twisted in helical form, an indicator carried by the upper end of the shaft in operative relation to the dial, a lever pivoted to the outwardly extended portion of the bracket and having a portion intermediate its ends cooperating with the flattened helical portion of the shaft in such manner as to turn the shaft when the lever is swung on its pivot, and a float carried by the free end of the lever.

4. In combination, a dial having a bearing aperture, a bracket extending downwardly and outwardly therefrom and turned inwardly at its lower end in opposed relation to the dial, said inturned portion having a bearing aperture in alignment with the bearing aperture of the dial, a shaft having its ends journaled in said apertures, said shaft having a flattened portion twisted in helical form, an indicator carried by the upper end of the shaft in operative relation to the dial, the outwardly extended portion of the bracket having in substantially the plane of the longitudinal center of the spiral shaft a tongue struck therefrom to provide an eye, a wire loop having its central portion engaged through the aforesaid eye and its branches disposed on opposite sides of and in close proximity to the flattened helical portion of the shaft, and a float connected to the end of the loop in such manner as to prevent separation of the branches thereof.

5. In combination, a dial having a bearing aperture, a collar attached to and depending from the periphery of the dial, the collar having a bracket receiving socket, a bracket having its upper end inserted through the socket and engaged against the underneath surface of the dial, the dial having a positioning perforation bearing a given relation to the socket of the collar and which is closed by the upper end of the bracket, the bracket extending downwardly and then inwardly beneath the dial where it is provided with a bearing, a shaft having its lower end journaled within the bearing and its upper end projected through the aperture of the dial, the shaft and dial having cooperating indicating elements, said shaft having a flattened portion twisted in helical form, a lever pivoted to the bracket and having parts engaging opposite sides of the flattened helical portion of the shaft so as to rotate the shaft when the lever is swung, and a float connected to the lever.

6. In combination, a dial having a depending flange and an aperture, the flange having a tongue struck inward from the material whereof the flange is formed, a bracket having its upper end inserted between the tongue and body portion of the flange, the bracket extending downwardly and then inwardly beneath the dial where it is provided with a bearing, a shaft having its lower end journaled within said bearing and its upper end reduced and projected through the aperture of the dial, the shaft and dial carrying cooperating indicating elements, said shaft having a flattened portion twisted in helical form, a lever pivoted to the bracket and engaging the side of the flattened helical portion of the shaft so as to rotate the shaft when the lever is swung, and a float connected to the lever.

7. In combination, a dial having a bearing aperture, a sheet metal bracket of channel formation depending from the dial and having its lower end turned inwardly beneath the dial and provided with a bearing in substantial alignment with the aperture of the dial, the web of the bracket being beaded at the angle between its inturned lower end portion and the portion adjacent thereto, a shaft having its lower end journaled within the bearing of the bracket and its upper end extended through the aperture of the dial, the dial and shaft carrying cooperating indicating elements, said shaft having a flattened portion twisted in helical form, a lever having one of its ends pivoted to the bracket and engaging the side of the flattened helical portion of the shaft so as to rotate the shaft when the lever is swung, and a float connected to the free end of the lever.

8. In combination, a dial having a bearing aperture, a sheet metal bracket of channel formation depending from the dial and having its lower end turned inwardly beneath the dial and provided with a bearing in substantial alignment with the aperture of the dial, a portion of the web of the bracket being struck inward to form an eye that is situated a suitable distance below the dial, a shaft having its lower end journaled within the bearing of the bracket and its upper end extended through the aperture of the dial, the dial and shaft carrying cooperating indicating elements, said shaft having a flattened portion twisted in helical form, a lever constructed of a piece of wire bent to form substantially parallel branches and having one of its ends engage through the aforesaid eye of the bracket and its respective branches disposed in proximity to the opposite sides of the flattened helical portion of the shaft, and a float conected to the free end of the lever.

9. In combination, a dial having a bearing aperture, a member depending from the dial and provided with a bearing, a shaft having its lower end journaled within the bearing of said member and its upper end extended through the aperture of the dial, the dial and shaft carrying cooperating indicating elements, said shaft having a flattened portion twisted in helical form the aforesaid member having pivot means, a lever constructed of a piece of wire bent to form substantially parallel branches and having one of its ends pivoted to said means and its respective branches disposed in proximity to opposite sides of the flattened helical portion of the shaft, and a float connected to the free end of the lever.

10. In a liquid level indicator the combination of a support, a rotary spindle having a flat portion, said portion being twisted in spiral form, a lever pivoted to the support and having a slot remote from its axis and engageable with said twisted portion, a float on the free end of said lever, and a pointer associated with said spindle.

In testimony whereof, I hereunto affix my signature.

MARC RESEK.